(12) United States Patent
Bajpai et al.

(10) Patent No.: US 11,747,885 B2
(45) Date of Patent: *Sep. 5, 2023

(54) METHOD AND APPARATUS TO SAVE POWER IN USB REPEATERS/RE-TIMERS

(71) Applicant: Cypress Semiconductor Corporation, San Jose, CA (US)

(72) Inventors: Pradeep Kumar Bajpai, Sunnyvale, CA (US); Godwin Gerald Arulappan, Sunnyvale, CA (US); Anup Nayak, Fremont, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/989,533

(22) Filed: Nov. 17, 2022

(65) Prior Publication Data

US 2023/0081229 A1 Mar. 16, 2023

Related U.S. Application Data

(63) Continuation of application No. 17/192,650, filed on Mar. 4, 2021, now Pat. No. 11,513,584.

(51) Int. Cl.
*G06F 1/32* (2019.01)
*G06F 1/3234* (2019.01)
(Continued)

(52) U.S. Cl.
CPC .......... *G06F 1/3253* (2013.01); *G06F 1/3215* (2013.01); *G06F 13/382* (2013.01); *G06F 2213/0042* (2013.01)

(58) Field of Classification Search
CPC ...... G06F 1/266; G06F 1/3209; G06F 1/3215; G06F 1/325; G06F 1/3253; G06F 13/382; G06F 2213/0042; Y02D 10/00
(Continued)

(56) References Cited

U.S. PATENT DOCUMENTS 6,363,085 B1 * 3/2002 Samuels ............. G06F 13/4045
370/242
11,513,584 B2 * 11/2022 Bajpai .................. G06F 1/3209
(Continued)

FOREIGN PATENT DOCUMENTS

JP 2008257690 A * 10/2008

*Primary Examiner* — Chun Cao (57) ABSTRACT

Disclosed are techniques for saving power in a Universal Serial Bus (USB) repeater/re-timer between a USB host and a peripheral device by intercepting packets received from the host to predict the direction of data traffic to selectively turn off/on circuitry of a peripheral port used to receive packets from the peripheral device. If a host port determines that the host is sending a start-of-frame (SOF) packet, the direction of data flow is from the host to the peripheral device, and the repeater may turn off the peripheral port such as squelch circuitry. If the host port determines that the host is sending a non-SOF packet, such as an address token that precedes a host-to-peripheral-device data transfer or a peripheral-device-to-host data transfer, the direction of data flow is anticipated to be from the peripheral device to the host, and the repeater may re-enable the deactivated circuitry of the peripheral port.

20 Claims, 8 Drawing Sheets

(51) Int. Cl.
  *G06F 1/3215* (2019.01)
  *G06F 13/38* (2006.01)
(58) Field of Classification Search
  USPC .......................................................... 713/320
  See application file for complete search history.

(56) References Cited

U.S. PATENT DOCUMENTS

2014/0149609 A1* 5/2014 Chan ..................... G06F 13/385
  710/16
2022/0035433 A1* 2/2022 Franko .................. G06F 1/3209

* cited by examiner

METHOD AND APPARATUS TO SAVE
POWER IN USB REPEATERS/RE-TIMERS

RELATED APPLICATIONS

This application is a continuation application of U.S. Non-Provisional patent application Ser. No. 17/192,650, filed Mar. 4, 2021, the entire contents of which are incorporated herein by this reference.

TECHNICAL FIELD

This disclosure generally relates to Universal Serial Bus (USB) systems, and more particularly, to methods and systems to save power in USB repeaters/re-timers.

BACKGROUND

Various electronic devices (e.g., such as smartphones, tablets, notebook computers, laptop computers, hubs, chargers, adapters, etc.) are configured to communicate data or transfer power through a Universal Serial Bus (USB) connector system. Devices of a USB system may communicate at various data rates. In some applications, a repeater/re-timer device in a USB hub is used to connect a mix of devices operating at different data rates to a host. The repeater/re-timer device, or simply referred to as a repeater, may receive a USB packet transmitted from a host at a higher data rate and may retransmit the USB packet at the same or a lower data rate to one or more downstream devices. Similarly, the repeater may receive a USB packet transmitted from a downstream device at one data rate and may retransmit the USB packet at the same or a higher data rate to a host. As the demand for more throughput pushes the data rate supported by USB systems ever higher, and as USB repeaters are supporting more parallel data channels and are being integrated into portable devices, low power consumption of USB repeaters becomes an important design requirement.

One opportunity to minimize the power consumption of a repeater without compromising data throughput is when the repeater is in an idle state not performing data transfer and waiting to receive packets. The reason is that keeping alive receiving circuitry on both ports of the repeater in order to be ready to receive data on any one port while in the idle state burns substantial power. If there is a way to anticipate the timing of an incoming data packet or the idle state, there may be an opportunity to disable the receiving circuitry to save power. However, this may be difficult because when the repeater forwards data packets from one port to another the repeater is unaware of the data transaction protocol between the host and the device. Requiring the repeater to intercept data packets to determine the host/device data transaction protocol would introduce substantial overhead, potentially offsetting any power saving to be gained from disabling the receiving circuitry. Thus, a need exists to find a way to lower power consumption when the repeater is in the idle state with minimal complexity and cost.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 1 is a block diagram that illustrates a repeater device (or simply a repeater) of a USB system used to repeat data packets between an embedded USB2 (eUSB2) port and a USB2 port, in accordance with one aspect of the present disclosure;

DETAILED DESCRIPTION

Examples of various aspects and variations of the subject technology are described herein and illustrated in the accompanying drawings. The following description is not intended to limit the invention to these embodiments, but rather to enable a person skilled in the art to make and use this invention.

Described herein are various aspects of techniques for saving power in a Universal Serial Bus (USB) repeater/re-timer configured to exchange packets between a USB host and a peripheral device by intercepting packets received from the host to predict the direction of data traffic when the repeater is in an idle mode. In idle mode, there is no data transfer between the host and the peripheral device and the repeater is waiting to receive data. A host port of the repeater may intercept USB packets received from the host to predict the direction of data flow to selectively turn off or turn on receiver circuitry on the peripheral port. In one aspect, if the host port determines that the host is sending a start-of-frame (SOF) packet, the direction of data flow is from the host to the peripheral device, and the repeater may turn off the circuitry on the peripheral port used for receiving and repeating traffic from the peripheral device to save power. If the host port determines that the host is sending a non-SOF packet, such as an address token prior to transmitting data from host to the peripheral device or for requesting data from the peripheral device, the direction of data flow is anticipated to be from the peripheral device to the host, and the repeater may re-enable the deactivated circuitry of the peripheral port for the repeater to receive a handshake packet or a data packet from the peripheral device.

The peripheral devices connected to the USB repeater may include, without limitation, personal computers (e.g., laptop computers, notebook computers, and so forth), mobile computing devices (e.g., tablets, tablet computers, e-reader devices, and so forth), mobile communication devices (e.g., smartphones, cell phones, personal digital assistants, messaging devices, pocket PCs, and so forth), connectivity and charging devices (e.g., hubs, docking stations, adapters, chargers, etc.), audio/video/data recording and/or playback devices (e.g., cameras, voice recorders, hand-held scanners, monitors, and so forth), and other similar electronic devices that can use USB connectors (interfaces) for communication and/or battery charging.

As used herein, an electronic device or a system is referred to as "USB-enabled" or "USB-compliant" if the electronic device or system complies with at least one release of a USB specification. Examples of such USB specifications include, without limitation, the USB Specification Revision 2.0, the USB 3.0 Specification, the USB 3.1 Specification, and/or various supplements (e.g., such as On-The-Go, or OTG), versions and errata thereof. The USB specifications generally define the characteristics (e.g., attributes, protocol definition, types of transactions, bus management, programming interfaces, and so forth) of a differential serial bus that are required to design and build standard communication systems and peripherals.

For example, a USB-enabled peripheral electronic device attaches to a USB-enabled host device through a USB port of the host device to form a USB-enabled system. The host device may embed a USB repeater to perform re-timing and voltage level shifting between the serial bus on the host side running at a lower core voltage of the host device and the serial data on the peripheral side compliant with the USB specification. A USB 2.0 (or simply USB2) port may include a power line (e.g., $V_{BUS}$) of 5V, a differential pair of data lines (e.g., which may be denoted D+ or DP, and D− or DN), and a ground line (e.g., GND) for power return. A USB 3.0 port also provides the $V_{BUS}$, D+, D−, and GND lines for backward compatibility with USB 2.0. In addition, to support a faster differential bus (the USB SuperSpeed bus), a USB 3.0 port also provides a differential pair of transmitter data lines (denoted SSTX+ and SSTX−), a differential pair of receiver data lines (denoted SSRX+ and SSRX−), a power line for power (e.g., which may be denoted DPWR), and a ground line for power return (e.g., which may be denoted DGND). A USB 3.1 port provides the same lines as a USB 3.0 port for backward compatibility with USB 2.0 and USB 3.0 communications, but extends the performance of the SuperSpeed bus by a collection of features referred to as Enhanced SuperSpeed.

A more recent technology for USB connectors, called USB Type-C and defined in various releases of the USB Type-C specification, provides USB Type-C receptacle, plug, and cables that can support USB communications as well as power delivery over newer USB power delivery protocols defined, for example, in one or more revisions USB Power Delivery (USB-PD) specifications. As used herein, a "USB Type-C subsystem" may refer to, for example, hardware circuitry that may be controllable by firmware and/or software in an integrated circuit (IC) controller, which is configured and operable to perform the functions and to satisfy the requirements specified in at least one release of the USB Type-C specification.

Some electronic devices may use a low-voltage USB 2.0 interface optimized for power compliant with the eUSB2 Physical Layer Specification (e.g., Revision 1.1 or later), Supplement to USB 2.0, referred to as embedded USB (eUSB or eUSB2). eUSB uses 1.2 V signaling to decouple external USB 2.0 and/or USB Type-C ports from internal components of electronic devices that are fabricated with lower technology nodes running at lower voltages. A High-Speed repeater between a USB-enabled host device and a USB-compliant electronic device may convert between signaling using the eUSB and USB 2.0 standards.

A USB-compliant electronic device may be connected to a USB-enabled host device through one or more hubs to form a USB-enabled system. The device may exchange data packets with the host and receive power from the host through the one or more hubs using USB 2.0 and/or USB Type-C ports. A hub allows the host to connect the host to a mix of devices operating at different data rates. A repeater in the hub may receive a USB packet transmitted from the host at a higher data rate and may retransmit the USB packet at the same or a lower data rate to the devices. Under USB 2.0, the USB-enabled system is capable of operating at a High-Speed (HS) rate with a maximum date rate of 480 Mbits per second (Mb/s). The devices may fall back to the Full-Speed (FS) rate of 12 Mb/s or the Low-Speed (LS) rate of 1.5 Mb/s of USB 1.0 if necessary. A USB 2.0 compliant repeater may support re-timing functionality for High-Speed, Full-Speed, and Low-Speed.

FIG. 1 is a block diagram that illustrates a repeater 100 of a USB subsystem, in accordance with one aspect of the present disclosure. Such USB subsystem may be implemented as part of, and/or within, a USB-enabled system such as a USB2.0 hub or a USB2.0 docking station. The repeater 100 may be embedded in an integrated circuit (IC) controller chip manufactured on an IC die, such as an IC controller chip of a USB hub. In another example, the repeater 100 may be a single-chip IC that is manufactured as a System-on-Chip (SoC). The repeater 100 may be a eUSB/USB repeater that performs the repeating functionality between an embedded USB2 (eUSB2) port compliant with the eUSB2 Physical Layer Specification 1.1, Supplement to USB 2.0 and a USB2 port compliant with USB 2.0. In another example, the repeater 100 may perform the repeating functionality between two USB2 ports.

Among other components, repeater 100 may include CPU subsystem 102, system interconnect 112, peripheral interconnect 114, system resources 116, various input/output (I/O) blocks (e.g., 118A-118C), and eUSB repeater subsystem 124. In addition, repeater 100 may provide circuitry and firmware that is configured and operable to support a number of power states 122. The CPU subsystem 102 may include one or more CPUs (central processing units) 104, flash memory 106, SRAM (Static Random Access Memory) 108, and ROM (Read Only Memory) 110 that are coupled to system interconnect 112. CPU 104 is a suitable processor that can operate in a system-on-chip device. In some embodiments, CPU 104 may be optimized for low-power operation with extensive clock gating and may include various internal controller circuits that allow CPU 104 to operate in various power states.

For example, CPU 104 may include a wake-up interrupt controller that is configured to wake CPU 104 from a sleep state, thereby allowing power to be switched "OFF" when the repeater 100 is in the sleep state. Flash memory 106 can be any type of program memory (e.g., NAND flash, NOR flash, and so forth) that is configurable for storing data and/or programs. SRAM 108 can be any type of volatile or non-volatile memory that is suitable for storing data and firmware/software instructions accessed by CPU 104. ROM 110 can be any type of suitable storage that is configurable for storing boot-up routines, configuration parameters, and other system-on-chip firmware parameters and settings. System interconnect 112 is a system bus (e.g., a single-level or multi-level Advanced High-Performance Bus, or AHB) that is configured as an interface that couples the various components of CPU subsystem 102 to each other, as well as a data and control interface between the various components of the CPU subsystem and peripheral interconnect 114.

Peripheral interconnect 114 is a peripheral bus (e.g., a single-level or multi-level AHB) that provides the primary data and control interface between CPU subsystem 102 and its peripherals and other resources, such as system resources 116, I/O blocks (e.g., 118A-118C), and eUSB repeater subsystem 124. The peripheral interconnect 114 may include various controller circuits (e.g., direct memory access, or DMA controllers), which may be programmed to transfer data between peripheral blocks without burdening the CPU subsystem. In various embodiments, each of the components of the CPU subsystem 102 and the peripheral interconnect 114 may be different with each choice or type of CPU, system bus, and/or peripheral bus.

System resources 116 may include various electronic circuits that support the operation of repeater 100 in its various states and modes. For example, system resources 116 may include a power subsystem that provides the power resources required for each controller state/mode such as, for example, voltage and/or current references, wake-up interrupt controller (WIC), power-on-reset (POR), etc. In some embodiments, the power subsystem of system resources 116 may also include circuits that allow repeater 100 to draw and/or provide power from/to external sources with several different voltage and/or current levels. System resources 116 may also include a clock subsystem that provides various clocks that are used by repeater 100, as well as circuits that implement various controller functions such as external reset.

An IC controller, such as repeater 100, may include various different types of I/O blocks and subsystems in various embodiments and implementations. For example, in the embodiment illustrated in FIG. 1, repeater 100 may include GPIO (general purpose input output) blocks 118A, TCPWM (timer/counter/pulse-width-modulation) blocks 118B, SCBs (serial communication blocks) 118C, and eUSB repeater subsystem 124. GPIOs 118A include circuits configured to implement various functions such as, for example, pull-ups, pull-downs, input threshold select, input and output buffer enabling/disabling, multiplex signals connected to various I/O pins, etc. TCPWMs 118B include circuits configured to implement timers, counters, pulse-width modulators, decoders and various other analog/mixed signal elements that are configured to operate on input/output signals. SCBs 118C include circuits configured to implement various serial communication interfaces such as, for example, I$^2$C, SPI (serial peripheral interface), UART (universal asynchronous receiver/transmitter), and so forth.

In certain embodiments, the eUSB repeater subsystem 124 may be utilized in accordance with the techniques described herein, and may also provide support for USB communications over USB ports, as well other USB functionality such as power delivery and battery charging. For example, eUSB repeater subsystem 124 may be a USB-PD subsystem, a USB Type-C subsystem, or both (e.g., a USB Type-C subsystem that supports USB-PD functionality). eUSB repeater subsystem 124 may include a transceiver and physical layer logic (PHY) 126, 128 for eUSB2 and USB 2.0, respectively, which are configured as integrated baseband PHY circuits to perform various digital encoding/decoding functions (e.g., Biphase Mark Code-BMC encoding/decoding, cyclical redundancy checks-CRC, and so forth) and analog signal processing functions involved in physical layer transmissions. The eUSB repeater subsystem 124 may be referred to as a eUSB re-timing repeater. In various embodiments, a repeater (e.g., such as eUSB repeater subsystem 124) may be implemented as hardware logic that includes various components such as logic gates, adders, multiplexers, latches, flip-flops, counters, registers, transistors, diodes, resistors, capacitors, and various circuits thereof. As will be further discussed below, the eUSB repeater subsystem 124 may include circuitry to intercept packets received from the host through the eUSB PHY 126 to predict the direction of data traffic when the eUSB repeater subsystem 124 is in an idle mode. The predicted direction of data traffic may be used to selectively turn off or turn on receiver circuitry in the USB PHY 128 connected to a peripheral device to save power.

Figure 2:
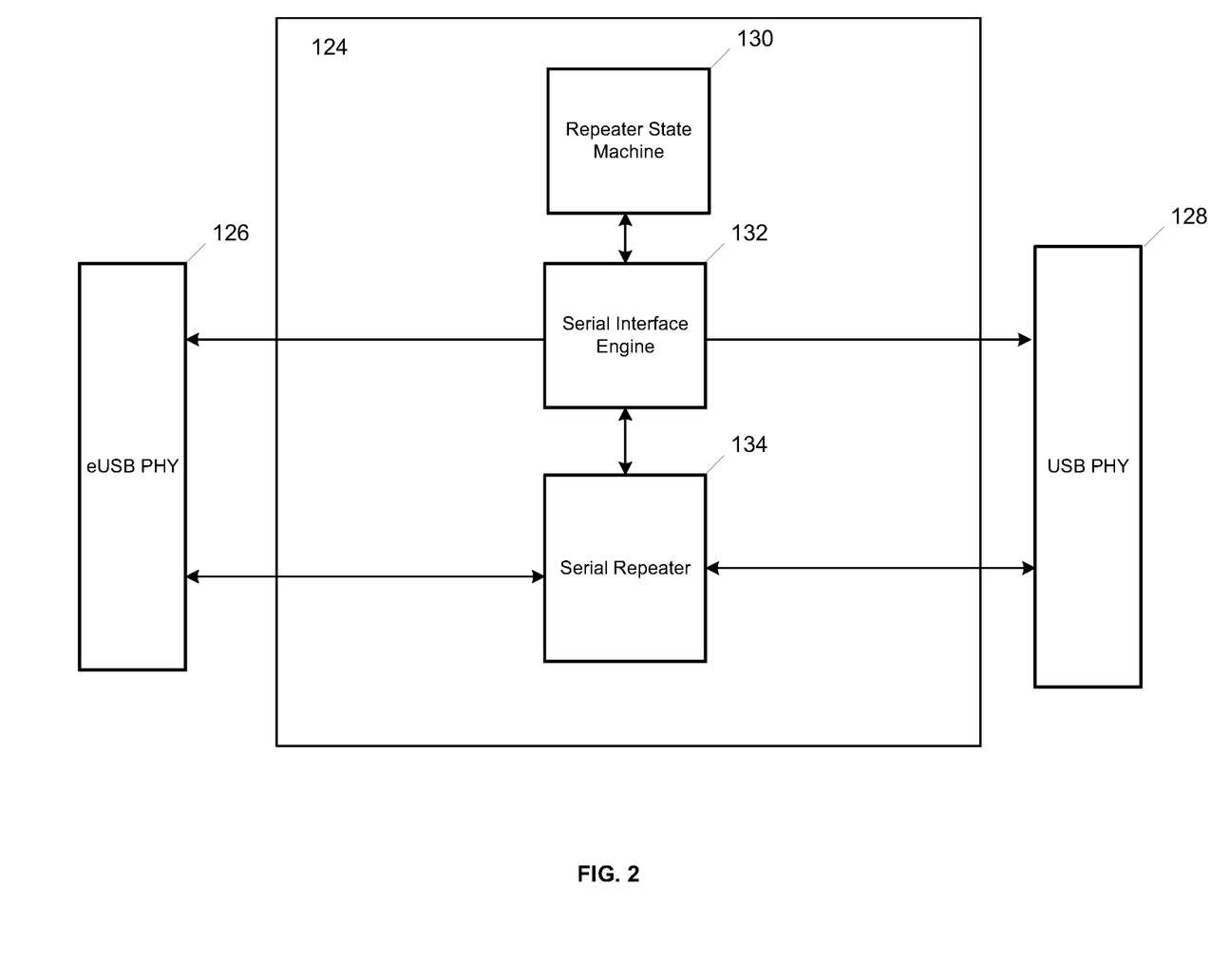
FIG. 2 is a block diagram that illustrates the eUSB repeater subsystem of FIG. 1 used to repeat data packets between an embedded USB2 (eUSB2) host port and a USB2 peripheral port, in accordance with one aspect of the present disclosure.

FIG. 2 is a block diagram that illustrates the eUSB repeater subsystem 124 of FIG. 1 used to repeat data packets between an embedded USB2 (eUSB2) port and a USB2 port, in accordance with one aspect of the present disclosure. The eUSB repeater subsystem 124 may include a serial repeater 134 configured to perform re-timing and repeating functionality of the data packets, a serial interface engine 132 configured to detect events on the eUSB2 and USB2 ports, and a repeater state machine configured to determine states of the serial repeater 134 based on the detected events. The eUSB repeater subsystem 124 may be connected to the eUSB2 port and the USB2 port through the eUSB PHY 126 and USB PHY 128, respectively.

The eUSB PHY 126 may be connected to a host or an intervening hub/repeater to receive data packets transmitted from the host through a differential pair of data lines DP and DM. The USB PHY 128 may be connected to a peripheral device or an intervening hub/repeater to retransmit the data packets at the same or lower data rate to the peripheral device through a second differential pair of data lines DP and DM. For data from the device to the host, the USB PHY 128 may receive data packets transmitted from the device and the eUSB PHY 126 may retransmit the data packets at the same or lower data rate to the host. High-Speed, Full-Speed, or Low-Speed data rate may be supported. For High-Speed data, the eUSB PHY 126 and USB PHY 128 may each include a transmission envelope detector (e.g., implemented as hardware logic) to perform clock and data recovery (CDR) function to lock to the SYNC bits of the received High-Speed data packets. The transmission envelope detector may produce a squelch signal to indicate no data if there is less than 100 μV between a differential pair of data lines.

The serial interface engine 132 may monitor activities on the host port of the eUSB PHY 126 and the device port of the USB PHY 128 to decode bus events and trigger appropriate action. The serial interface engine 132 may decode bus events to trigger repeater state machine 130 and to control the data path of packets through the serial repeater 134. For example, the serial interface engine 132 may determine the speed of the receiver (e.g., High-Speed, Full-Speed, or Low-Speed), detect configuration of the eUSB2 and USB2 ports, monitor the state of the data lines of the host or device, etc., to enable the repeating and retiming functionality of the serial repeater 134.

In one aspect, the serial interface engine 132 may detect a SOF packet received by the host port of the eUSB PHY 126 to disable the transmission envelope detector including the squelch detect circuitry in the device port of USB PHY 128, and to disable the circuitry in the serial repeater 134 used for repeating and retiming the data received from the device port. The host may transmit a SOF packet, also referred to as a SOF token, every millisecond in Full-Speed or Low-Speed USB to schedule access to the data bus and as a timing reference to synchronize isochronous and interrupt data transfers. The SOF packet may contain an 11-bit incrementing frame number. In High-Speed USB, the millisecond frame is divided into 8 micro-frames of 125 μs long. The host may transmit a High-Speed SOF packet for each micro-frame by repeating each frame number 8 times within each millisecond frame. Detecting the SOF packets provides an easy way to predict that the eUSB repeater subsystem 124 is in the idle mode in which no data is expected from the device, allowing the circuitry associated with detecting, receiving, repeating, and re-timing the device data packets to be disabled to save power. In one aspect, the serial interface engine 132 may gate off the clocks to the squelch circuitry in the device port of the USB PHY 128 and in the repeating and re-timing circuitry for the data received from the device port in the serial repeater 134.

When the next packet following the SOF packet from the host is a non-SOF packet, the serial interface engine 132 may re-enable the disabled circuitry for it to be ready to receive the data from the device port. For example, when the next packet is an in-token packet requesting the device to transmit a data packet, the direction of data flow for the data packet will be from the device to the host. When the next packet is an out-token packet indicating the transmission of a data packet from the host to the device, the direction of data flow may still be from the device to the host because the device transmits a handshake packet indicating whether the data packet is successfully received in response to the data packet. The serial interface 132 may determine whether a packet from the host is a SOF packet or a non-SOF packet by decoding the packet identifier (PID) byte of the packets. After the transmission envelope detector in the device port of USB PHY 128 and the repeating and re-timing circuitry for receiving the device data in the serial repeater 134 are re-enabled, they may remain enabled until the next SOF packet is received.

The repeater state machine 130 may receive decoded bus events from the serial interface engine 132 and internal states of the serial repeater 134 to control the operation of the serial repeater 134. The repeater state machine 130 may also control the states of the eUSB repeater subsystem 124 to implement the states compliant with the eUSB specification.

Figure 3:
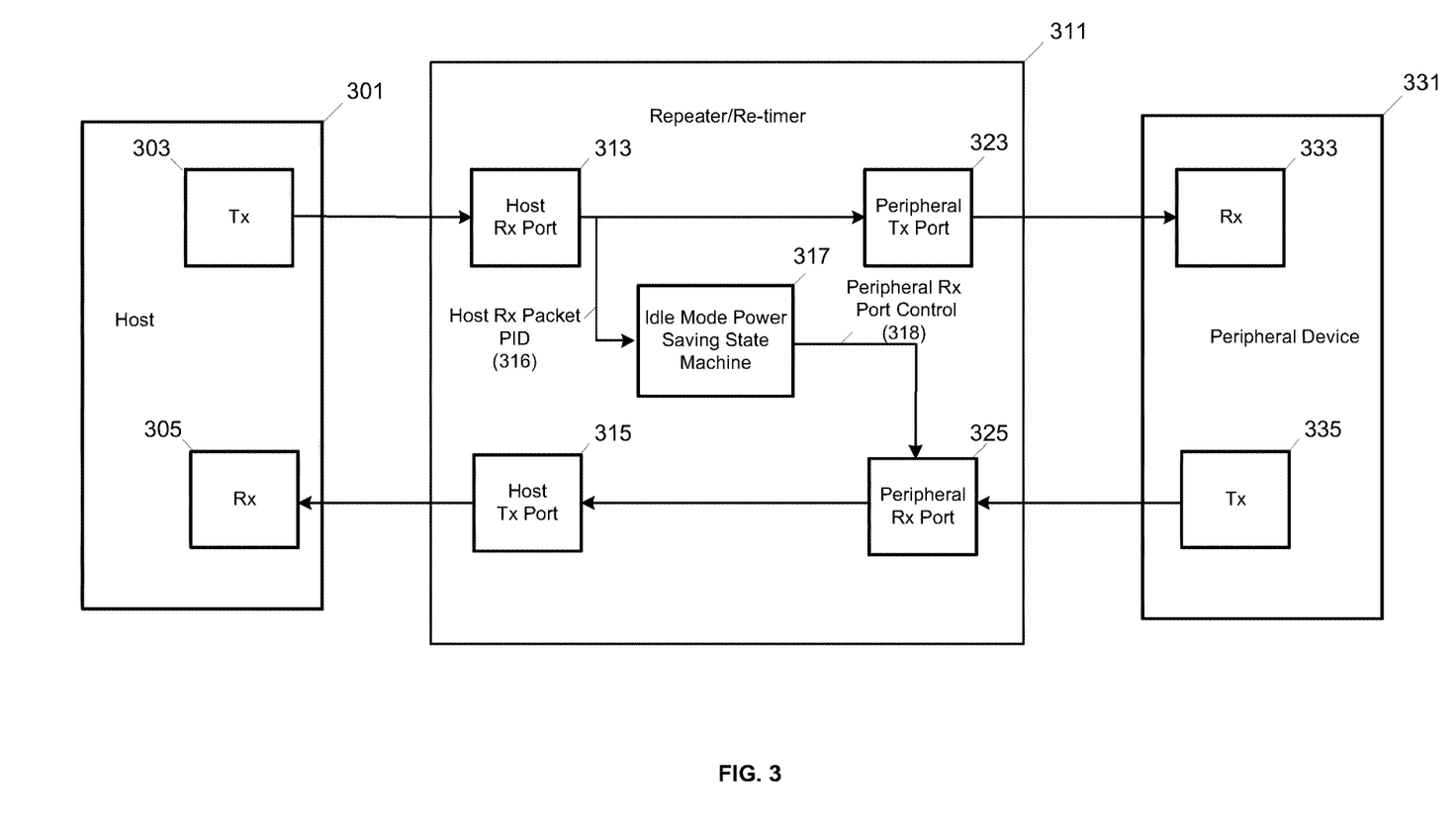
FIG. 3 illustrates a block diagram of the data flow of a USB repeater/re-timer device that intercepts USB packets received from the host to predict the direction of the data flow to control the operation of the peripheral receive port, in accordance with one aspect of the present disclosure.

FIG. 3 illustrates a block diagram of the data flow of a USB repeater/re-timer device 311 that intercepts USB packets received from the host 301 to predict the direction of the data flow to control the operation of the peripheral receive port 325, in accordance with one aspect of the present disclosure. The host 301 may have a transmit port 303 to transmit USB packets to a peripheral device 331 through the repeater/re-timer 311 and a receive port 305 to receive USB data packets from the peripheral device 331 through the repeater/re-timer 311. The peripheral device 331 may have a receive port 333 to receive USB data packets from the host 301, and a transmit port 335 to transmit USB packets to the host 301, through the repeater/re-timer 311. The repeater/re-timer 311 may be implemented by the eUSB repeater subsystem 124, eUSB PHY 126, and USB PHY 128 of FIGS. 1 and 2, or may be implemented as a stand-alone repeater.

A host Rx port 313 of the repeater/re-timer 311 may receive USB packets transmitted by the host 301 through a differential pair of data lines. The host Rx port 313 may support Low-Speed, Full-Speed, High-Speed data rate of USB 2.0, SuperSpeed of USB 3.0, Enhanced SuperSpeed of USB 3.1, etc. In one aspect, the host Rx port 313 may have a transmission envelope detector, squelch or other receive circuitry to detect activities on the data lines such as when there is more than 100 μV between the differential data lines in High-Speed and when there is a SYNC bit pattern that indicates the presence of a packet from the host 301. When a packet is detected, the repeater/re-timer 311 may perform the re-timing and repeating functionality on the serial bits of the packet before forwarding the packet to the peripheral Tx port 323 for transmission to the peripheral device 331.

When a packet from the host 301 is detected, the host Rx port 313 may forward the packet identifier (PID) byte 316 that follows the SYNC bit pattern to the idle mode power saving state machine 317 to determine whether the packet is a SOF packet. If the PID byte 316 indicates a SOF packet, the USB transaction protocol is considered to be in the idle mode in which no packets are expected from the peripheral device 331. The idle mode power saving state machine 317 may transmit a peripheral Rx port control signal 318 to the peripheral Rx port 325 to put it into a power saving state.

Similar to the host Rx port 313, the peripheral Rx port 325 may have a transmission envelope detector, squelch or other receive circuitry to detect activities on the data lines from the peripheral device 331 and when there is a SYNC bit pattern that indicates the presence of a packet from the peripheral device 331. Upon receiving the Rx port control signal 318 in the idle mode, the peripheral Rx port 325 may disable the receive circuitry. In one aspect, the circuitry in the repeater/re-timer 311 that performs the re-timing and repeating of the serial bits of packets received from the peripheral device 331 may also be disabled.

When the PID byte 316 of the packet from the host 301 indicates a non-SOF packet, the USB system is not in the idle mode. For example, the packet may be an in-token packet requesting the peripheral device 331 device to transmit a data packet to the host 301 or an out-token packet preceding the transmission of a data packet from the host 301 to the peripheral device 331. In both scenarios, the peripheral Rx port 313 is expected to receive from the peripheral device 331 the requested data packet or a handshake packet indicating whether the data packet transmitted by the host 301 was successfully received. The idle mode power saving state machine 317 may transmit the peripheral Rx port control signal 318 to the peripheral Rx port 325 to re-enable the receive circuitry if it was previously disabled. In one aspect, the circuitry that performs the re-timing and repeating of the packets received from the peripheral device 331 may also be re-enabled if it was previously disabled. When the peripheral Rx port 325 receives the packet from the peripheral device, the repeater/re-timer 311 may perform the re-timing and repeating functionality on the serial bits of the packet before forwarding the packet to the host Tx port 315 for transmission to the host 301.

In one aspect, the repeater/re-timer device 311 may repeat USB packets between the host 301 and multiple peripheral devices 331 connected through a corresponding peripheral Rx port 325. The repeater/retime 311 may intercept the USB packets received from the host 301 to predict the direction of the data flow to control the operations of the peripheral Rx port 325 corresponding to each of the peripheral devices 331. For example, when the host Rx port 313 receives a SOF packet from the host, the idle mode power saving state machine 317 may transmit a peripheral Rx port control signal 318 to the peripheral Rx port 325 corresponding to each of the peripheral devices 331 to put all of them into a power saving state. When the host Rx port 313 receives a non-SOF packet from the host addressed to one of the peripheral devices 331, the idle mode power saving state machine 317 may transmit a peripheral Rx port control signal 318 to enable the peripheral Rx port 325 corresponding to the addressed peripheral devices 331 while maintaining the peripheral Rx port 325 corresponding to the non-addressed peripheral devices 331 in the power saving state.

Figure 4:
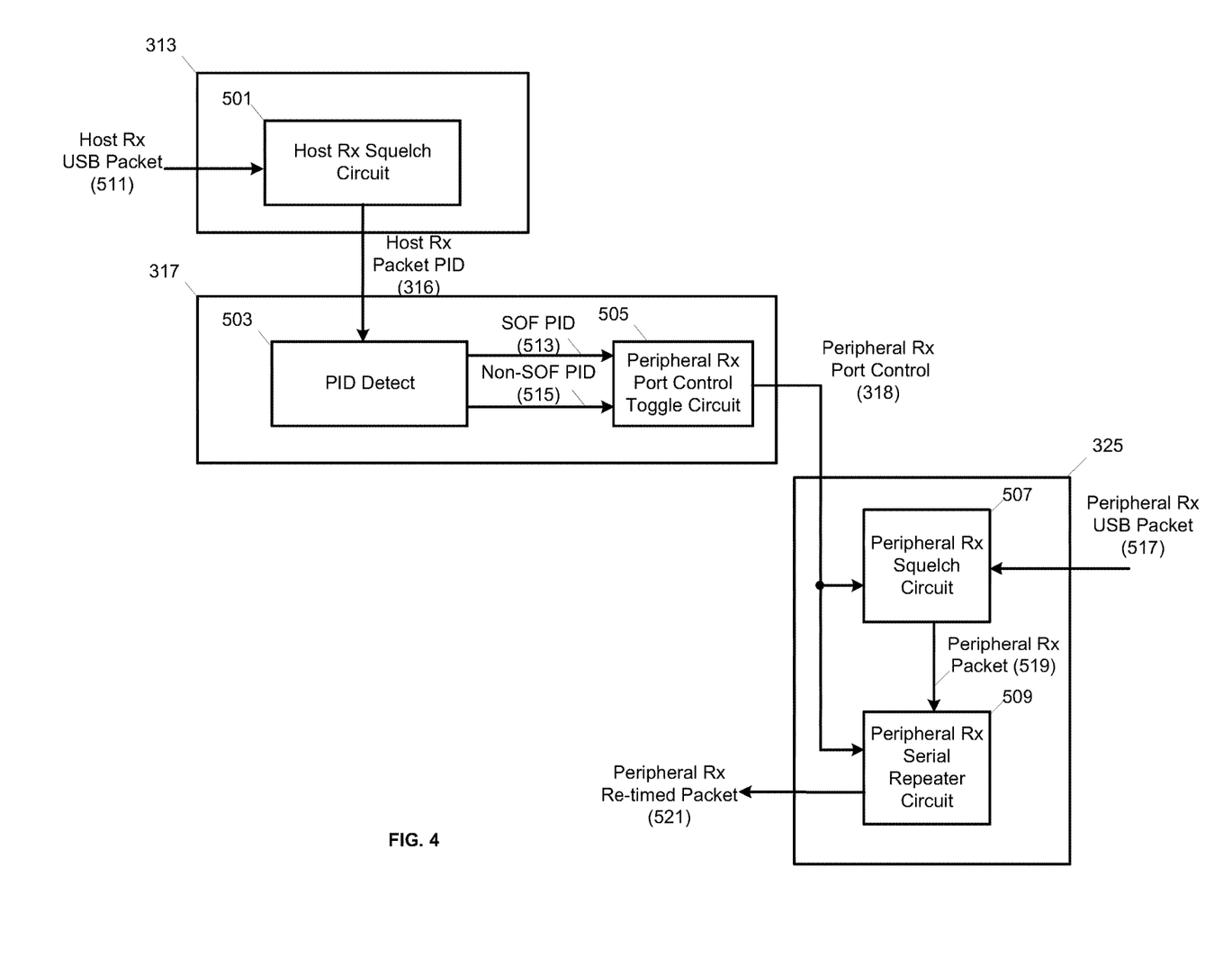
FIG. 4 illustrates a functional block diagram of the USB repeater/re-timer device of FIG. 3 that operates to intercept USB packets received from the host to control the peripheral receive port to save power in the idle mode, in accordance with one aspect of the present disclosure.

FIG. 4 illustrates a functional block diagram of the USB repeater/re-timer device 311 of FIG. 3 that operates to intercept USB packets 511 received from the host to control the peripheral receive port to save power in the idle mode, in accordance with one aspect of the present disclosure. The host Rx port 313 has a host Rx squelch circuit 501 to detect the absence of squelch indicating activities on the data lines from the host and to detect the start of a valid packet. The host Rx squelch circuit 501 may extract and forward the PID byte 316 of the detected packet to the idle mode power saving state machine 317.

A PID detect module 503 in the idle mode power saving state machine 317 may receive the PID byte 316 of the detected packet from the host to determine if the packet is a SOF packet or a non-SOF packet. If the packet is a SOF packet, the PID detect module 503 may transmit a SOF PID signal 513 to a peripheral Rx port control toggle circuit 505 for it to generate the peripheral Rx port control signal 318 to put the peripheral Rx port 325 into the power saving state. If the packet is a non-SOF packet, the PID detect module 503 may transmit a non-SOF PID signal 515 to the peripheral Rx port control toggle circuit 505 for it to generate the peripheral Rx port control signal 318 to take the peripheral Rx port 325 out of the power saving state. The peripheral Rx port control signal 318 may thus toggle between two states as a function of whether the detected packet from the host is a SOF packet or not.

The peripheral Rx port 325 may have a peripheral Rx squelch circuit 507 containing circuitry such as the transmission envelope detector, squelch or other circuitry configured to receive packets 517 from the peripheral device 331 to generate the peripheral Rx packet 519. A peripheral Rx serial repeater circuit 509 may be configured to perform the re-timing and repeating functionality on the serial bits of the peripheral Rx packet 517. When the peripheral Rx port control signal 318 is received commanding the peripheral Rx port 325 to enter or to remain in the power saving state, the peripheral Rx squelch circuit 507 and the peripheral Rx serial repeater circuit 509 may be disabled or may remain disabled. In one aspect, clocks to the peripheral Rx squelch circuit 507 and the peripheral Rx serial repeater circuit 509 may be gated off. On the other hand, when the peripheral Rx port control signal 318 is received commanding the peripheral Rx port 325 to exit the power saving state or to remain in an active state, the peripheral Rx squelch circuit 507 and the peripheral Rx serial repeater circuit 509 may be enabled or may remain enabled to prepare to receive and to process packets from the peripheral device. The peripheral Rx squelch circuit 507 may receive the packet 517 from the peripheral device to generate the peripheral Rx packet 519. The peripheral Rx serial repeater circuit 509 may process the peripheral Rx packet 519 to generate the peripheral Rx re-timed packet 521 for transmission to the host.

Figure 5:
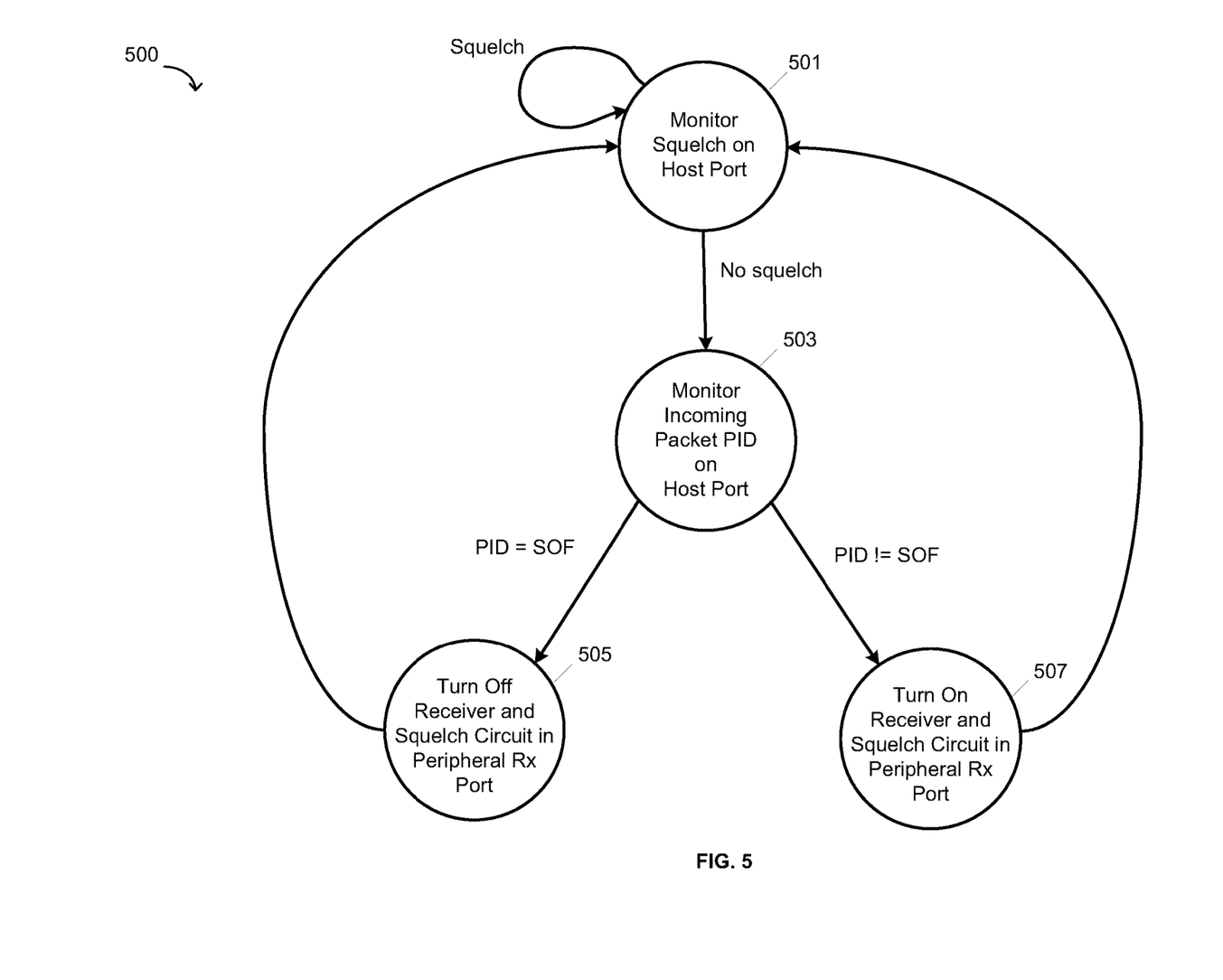
FIG. 5 illustrates a state machine of a USB repeater/re-timer device that monitors USB packets on the host receive port to control the operation of the peripheral receive port to save power in the idle mode, in accordance with one aspect of the present disclosure.

FIG. 5 illustrates a state machine 500 of a USB repeater/re-timer device that monitors USB packets on the host Rx port to control the operation of the peripheral Rx port to save power in the idle mode, in accordance with one aspect of the present disclosure. The state machine 500 may be implemented by the host Rx port 313 and the idle mode power saving state machine 317 of FIG. 3, or the host Rx squelch circuit 501, PID detect module 503, and the peripheral Rx port control toggle circuit 505 of FIG. 4.

At operation 501, the state machine 500 monitors a squelch signal on the host Rx port. In one aspect, a transmission envelope detector may detect activities on the data lines from the host such as when there is more than 100 µV between the differential data lines in High-Speed or other data rates. If a squelch signal is detected, indicating less than 100 µV between the differential data lines, operation 501 keeps monitoring the squelch signal. Otherwise, if the squelch signal is not detected, indicating there are activities on the data lines, the state machine 500 may detect a SYNC bit pattern that indicates the start of an incoming packet from the host to transition to operation 503.

At operation 503, the state machine 500 monitors the PID byte that follows the SYNC bit pattern to determine whether the packet is a SOF. If the PID byte indicates a SOF packet, the USB transaction protocol is considered to be in the idle mode and the direction of data flow is from the host to the peripheral device. The state machine 500 transitions to operation 505 to turn off the receiver and squelch circuit in the peripheral Rx port to save power. In one aspect, the circuitry that perform the re-timing and repeating functionality of the data received by the peripheral Rx port may also be turned off. The state machine may then return to operation 501 to monitor the squelch signal on the host Rx port to look for the next packet from the host.

At operation 503, if the PID byte indicates a non-SOF packet, the USB transaction protocol is no longer considered to be in the idle mode and the direction of data flow may be from the peripheral device to the host. The state machine 500 transitions to operation 507 to turn on the receiver and squelch circuit in the peripheral Rx port to prepare it to receive a packet from the peripheral device. In one aspect, the circuitry that perform the re-timing and repeating functionality of the data received by the peripheral Rx port may also be turned on. The state machine may then return to operation 501 to monitor the squelch signal on the host Rx port to look for the next packet from the host.

Figure 6:
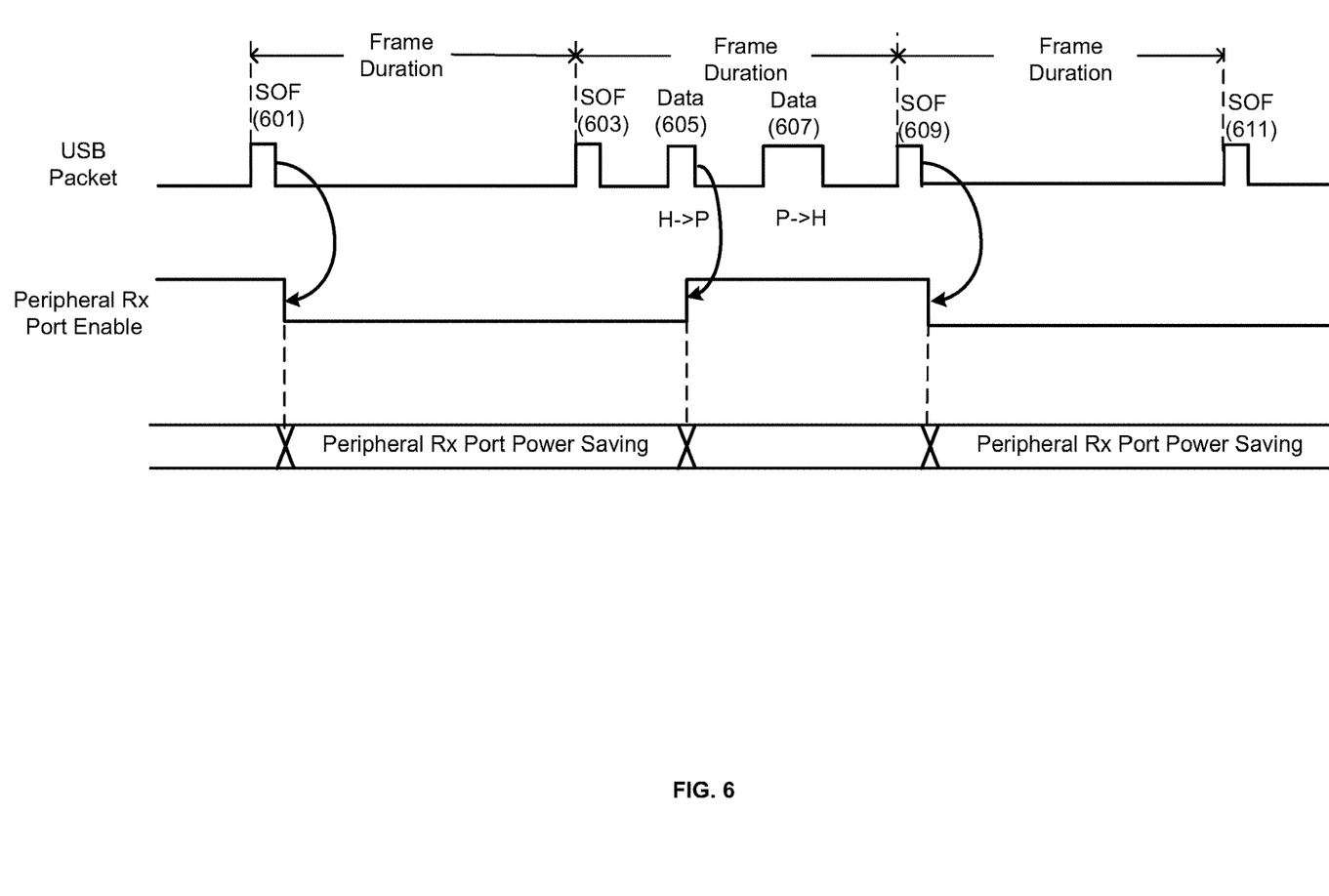
FIG. 6 illustrates a timing diagram of the host receive port of a USB repeater/re-timer monitoring the USB packets from the host to disable the peripheral receive port when a start-of-frame (SOF) packet is received and to enable the peripheral receive port when a non-SOF packet is received in a first scenario of host and device data transaction, in accordance with one aspect of the present disclosure.

FIG. 6 illustrates a timing diagram of the host Rx port of a repeater/re-timer monitoring the USB packets from the host to disable the peripheral Rx port when a start-of-frame (SOF) packet is received and to enable the peripheral Rx port when a non-SOF packet is received in a first scenario of host and device data transaction, in accordance with one aspect of the present disclosure.

The host Rx port monitors bus activities on the data lines from the host to detect the presence of a USB packet. If a packet is detected, the host Rx port determines whether the packet is a SOF packet by decoding the PID byte. Initially, the peripheral Rx port may be enabled to prepare to receive packets from the peripheral device. When the host Rx port detects the first SOF packet 601, the host Rx port disables the peripheral Rx port by toggling the peripheral Rx port enable signal to put the peripheral Rx port into the power saving state. In one aspect, the peripheral Rx port enable signal may be the peripheral Rx port control signal 318 of FIG. 4 or 5. In the frame following the first SOF packet 601, the host does not transmit any other packets. When the host Rx port detects the second SOF packet 603, the peripheral Rx port remains in the power saving state. In one aspect, the frame duration between the SOF packets may be one millisecond in Full-Speed or Low-Speed USB, the 125 μs micro-frame duration in High-Speed USB, or frame cycle intervals of other USB specification.

When the host Rx port receives the first data packet 605 from the host, the host Rx port re-enables the peripheral Rx port by toggling the peripheral Rx port enable signal to command the peripheral Rx port to exit the power saving state. In one aspect, the data packet 601 may include an out-address-token packet indicating a host-to-device data transfer followed by the data packet containing the data for the peripheral device. In one aspect, there may be an in-address-token packet requesting a device-to-host data transfer from the peripheral device. In either scenario, the peripheral Rx port is enabled so it may be prepared to receive the second data packet 607. The second data packet 607 may be a handshake packet from the peripheral device back to the host indicating whether the peripheral device successfully receives the data packet when the first data packet 601 is a host-to-device data transfer. In one aspect, the second data packet 607 may be the requested device-to-host data packet when the host transmitted an in-address-token packet. The repeater/re-timer performs the repeating and re-timing functionality on the serial bits of the second data packet 607 for transmission to the host.

When the host Rx port detects the third SOF packet 609, the host Rx port disables the peripheral Rx port by toggling the peripheral Rx port enable signal to put the peripheral Rx port back into the power saving state. The host does not transmit any other packets in the frame following the third SOF packet 609. When the host Rx port detects the fourth SOF packet 611, the peripheral Rx port remains in the power saving state.

Figure 7:
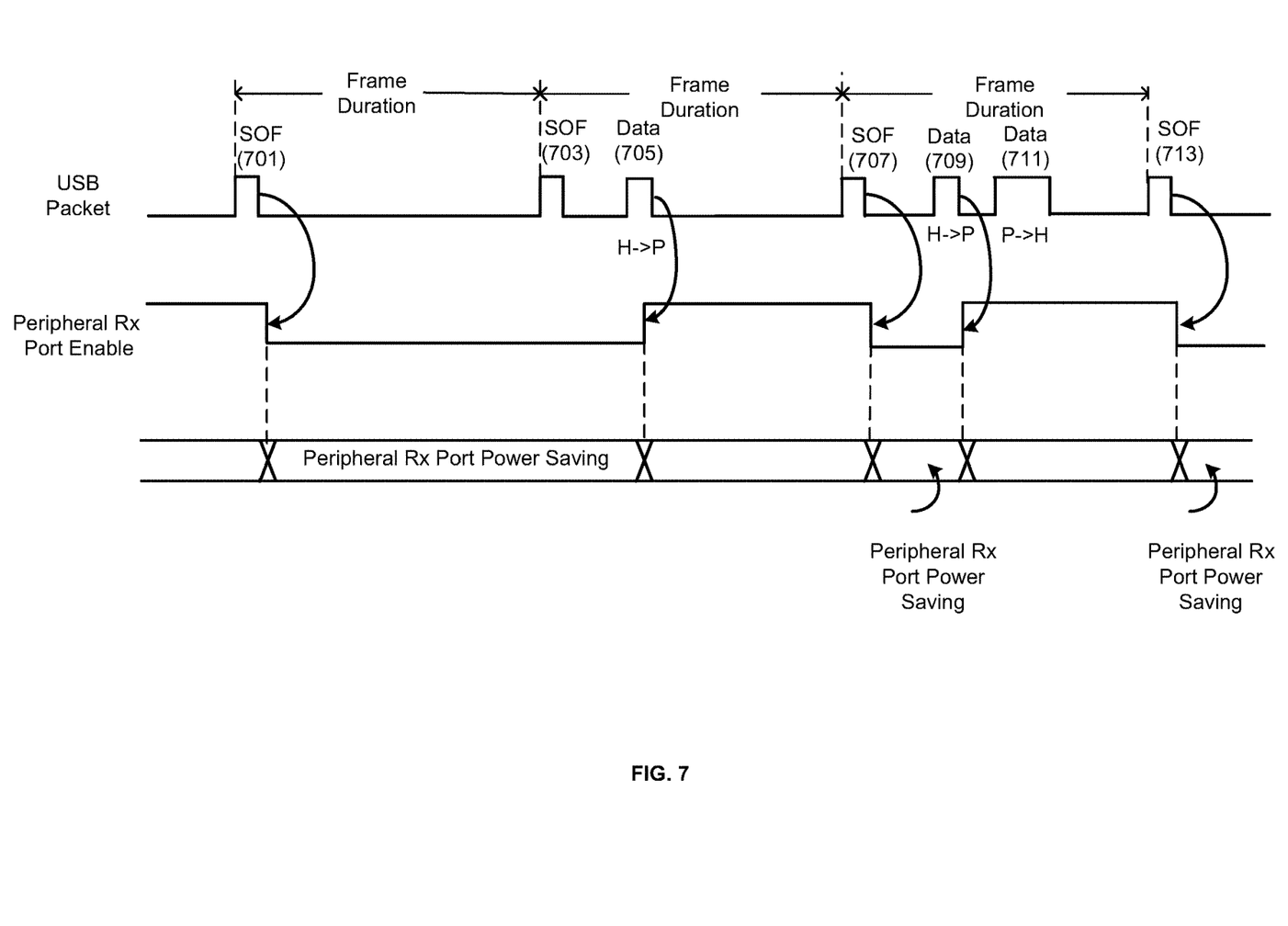
FIG. 7 illustrates a timing diagram of the host receive port of a USB repeater/re-timer monitoring the USB packets from the host to disable the peripheral receive port when a start-of-frame (SOF) packet is received and to enable the peripheral receive port when a non-SOF packet is received in a second scenario of host and device data transaction, in accordance with one aspect of the present disclosure.

FIG. 7 illustrates a timing diagram of the host Rx port of a repeater/re-timer monitoring the USB packets from the host to disable the peripheral Rx port when a start-of-frame (SOF) packet is received and to enable the peripheral Rx port when a non-SOF packet is received in a second scenario of host and device data transaction, in accordance with one aspect of the present disclosure.

Similar to FIG. 6, the host Rx port detects the first SOF packet 701 to disable the peripheral Rx port by toggling the peripheral Rx port enable signal to put the peripheral Rx port into the power saving state and the host Rx port maintains the peripheral Rx port in the power saving state upon detecting the second SOF packet 703. Also similar to FIG. 6, the host Rx port receives the first data packet 705 to re-enable the peripheral Rx port by toggling the peripheral Rx port enable signal to command the peripheral Rx port to exit the power saving state. The first data packet 701 may be a host-to-device data transfer or an in-address-token packet requesting a device-to-host data transfer from the peripheral device. However, due to bus error, the peripheral device does not transmit a data packet back to the host in response to the first data packet 705 within the frame duration of the second SOF packet 703.

The host may time out at the expiration of the frame duration of the second SOF packet 703 when it does not receive a data packet back from the peripheral device in response to the first data packet 705. When the host Rx port receives the third SOF packet 707, the host Rx port toggles the peripheral Rx port enable signal to put the peripheral Rx port back into the power saving state. During the frame duration of the third SOF packet 707, the host transmits the second data packet 709 to reissue the host-to-device data transfer. In one aspect, the host may re-transmit an in-address-token packet requesting a device-to-host data transfer from the peripheral device.

When the host Rx port receives the second data packet 709 from the host, the host Rx port toggles the peripheral Rx port enable signal to command the peripheral Rx port to exit the power saving state. In the frame duration of the third SOF packet 707, the peripheral device generates the third data packet 711 in response to the second data packet 709. The peripheral Rx port receives the third data packet 711 and the repeater/re-timer performs the repeating and re-timing functionality on the serial bits of the third data packet 711 for transmission to the host. When the host Rx port detects the fourth SOF packet 713, the host Rx port disables the peripheral Rx port by toggling the peripheral Rx port enable signal to put the peripheral Rx port back into the power saving state.

Figure 8:
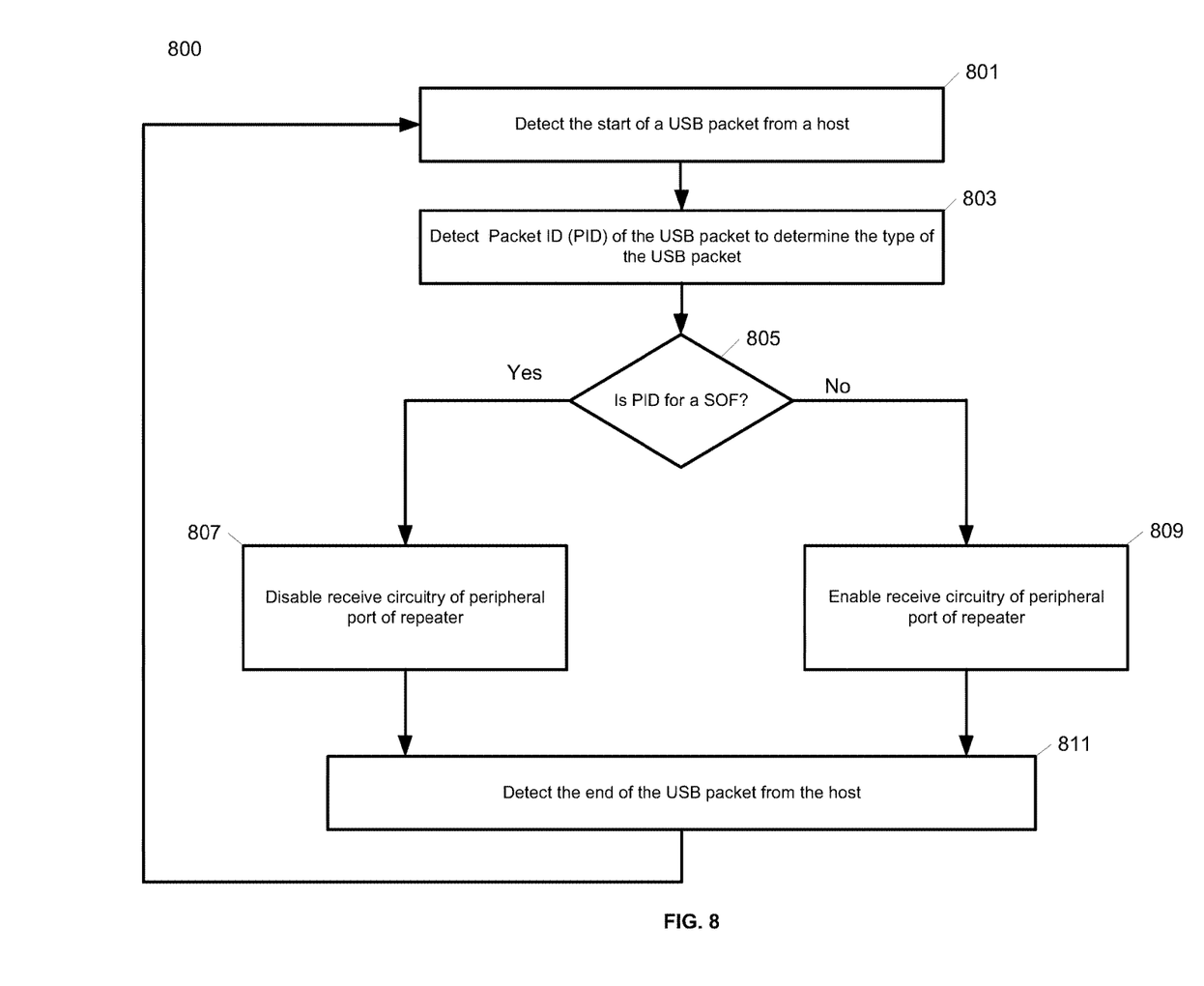
FIG. 8 is a flow diagram of a method for a repeater/re-timer to monitor USB packets received from the host to control operation of the peripheral receive port to save power in the idle mode, in accordance with one aspect of the present disclosure.

FIG. 8 is a flow diagram of a method 800 for a repeater/re-timer to monitor USB packets received from the host to control operation of the peripheral receive port to save power in the idle mode, in accordance with one aspect of the present disclosure. In one embodiment, the method 800 may be performed by the eUSB/USB repeater 100 of FIG. 1, the eUSB repeater subsystem 124, the eUSB PHY 126, and the USB PHY 128 of FIG. 2, the repeater/re-timer of FIG. 3, the host Rx port 313 and the idle mode power saving state machine 317 of FIG. 4, or the state machine 500 of FIG. 5. In one aspect, the method 800 may be performed utilizing hardware logic, or combinations of hardware logic and programmable registers that store configuration values.

At operation 801, the repeater/re-timer detects the start of a USB packet from the host. In one aspect, the repeater/re-timer may monitor a squelch signal on the data lines from the host in High-Speed or other data rates. If the squelch signal is absent, indicating there are activities on the data lines, the repeater/re-timer may detect a SYNC bit pattern to indicate the start of a USB packet from the host.

At operation 803, the repeater/re-timer detects the PID of the USB packet to determines the type of the packet. The PID may be a byte that follows the SYNC bit pattern to indicate whether the USB packet is a token, data, handshake, or a special packet. Operation 803 may detect the PID to predict the direction of data flow. For example, when the repeater/re-timer detects a token packet such as a SOF packet, the direction of data flow is from the host to the peripheral device. When the repeater/re-timer detects a token packet such as an address token that precedes a host-to-peripheral-device data transfer or a peripheral-device-to-host data transfer, the direction of data flow is predicted to be from the peripheral device to the host to include a handshake packet generated in response to the host-to-peripheral-device data transfer or the requested data packet of the requested peripheral-device-to-host data transfer.

At operation 805, the repeater/re-timer determines whether the PID indicates a SOF packet. If the PID indicates a SOF packet, the transaction protocol between the host and the peripheral device is considered to be in the idle mode and the peripheral device is not expected to transfer a packet to the host.

At operation 807, if the PID indicates a SOF packet, the repeater/re-timer disables the receive circuitry of the peripheral Rx port of the repeater/re-timer to save power. In one aspect, the repeater/re-timer may turn off the transmission envelope detector including the squelch detect and other receive circuitry in the peripheral Rx port and may disable the circuitry used for repeating and retiming the data received from the peripheral device. In one aspect, clocks to the receive, repeating and retiming circuitry used to receive and process the data from the peripheral device may be gated off.

Otherwise at operation 809, if the PID indicates a non-SOF packet, the repeater/re-timer enables the receive circuitry of the peripheral Rx port of the repeater/re-timer to prepare the peripheral Rx port to receive a packet from the peripheral device. In one aspect, the repeater/re-timer may turn on the transmission envelope detector including the squelch detect and other receive circuitry in the peripheral Rx port if the circuitry was turned off. In one aspect, the repeater/re-timer and may enable the circuitry used for repeating and retiming the data received from the peripheral device if it was previously turned off In one aspect, clocks to the receive, repeating and retiming circuitry used to receive and process the data from the peripheral device may be turned back on if they were gated off.

At operation 811, the repeater/re-timer detects the end of the USB packet from the host. In one aspect, the repeater/re-timer may detect the end-of-packet pattern corresponding to the various data rates. The repeater/re-timer then returns to operation 801 to detect the start of the next USB packet from the host.

Various embodiments of the USB repeater subsystem described herein to intercept host packets to predict the direction of data flow to disable non-active circuitry on the peripheral port may include various operations. These operations may be performed and/or controlled by hardware components, digital hardware and/or firmware/programmable registers (e.g., as implemented in computer-readable medium), and/or combinations thereof. The methods and illustrative examples described herein are not inherently related to any particular computer or other apparatus. Various systems (e.g., such as USB hubs and docking stations) may be used in accordance with the teachings described herein, or it may prove convenient to construct more specialized apparatus to perform the required method steps. The required structure for a variety of these systems will appear as set forth in the description above.

A computer-readable medium used to implement operations of various aspects of the disclosure may be non-transitory computer-readable storage medium that may include, but is not limited to, electromagnetic storage medium, magneto-optical storage medium, read-only memory (ROM), random-access memory (RAM), erasable programmable memory (e.g., EPROM and EEPROM), flash memory, or another now-known or later-developed non-transitory type of medium that is suitable for storing configuration information.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "may include", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing. For example, certain operations may be performed, at least in part, in a reverse order, concurrently and/or in parallel with other operations.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component.

Additionally, "configured to" or "configurable to" can include generic structure (e.g., generic circuitry) that is manipulated by firmware (e.g., an FPGA) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A device that repeats Universal Serial Bus (USB) packets exchanged between a host and a peripheral device, comprising:
a host receive port configured to receive USB packets from the host;
a host transmit port configured to transmit USB packets to the host;
a peripheral receive port configured to receive USB packets from the peripheral device;
a peripheral transmit port configured to transmit USB packets to the peripheral device;
a repeating circuitry configured to repeat and retime the USB packets received by the host receive port from the host for the peripheral device or the USB packets received by the peripheral receive port from the peripheral device for the host; and
a processing system configured to:
detect a USB packet received by the host receive port from the host;
determine a type of the USB packet received;
in response to the USB packet being determined to be a start-of-frame (SOF) packet, disable the peripheral receive port to stop the device from receiving USB packets from the peripheral device; and
in response to the USB packet being determined to be a non-SOF packet, enable the peripheral receive port to prepare the peripheral receive port to receive USB packets from the peripheral device.

2. The device of claim 1, wherein to detect the USB packet received by the host receive port from the host, the processing system is configured to:
detect a start of the USB packet; and
detect a packet identifier (PID) of the USB packet.

3. The device of claim 2, wherein to detect the start of the USB packet, the processing system is configured to:
detect an absence of a squelch signal when the host receive port is configured to receive USB High-Speed data packets from the host; and
detect a synchronization pattern of the USB packet.

4. The device of claim 1, wherein to determine the type of the USB packet received, the processing system is configured to:
detect a packet identifier (PID) of the USB packet; and
determine the type of the USB packet based on the PID.

5. The device of claim 1, wherein the SOF packet comprises a periodic packet transmitted by the host to the peripheral device as a timing reference to synchronize the USB packets exchanged between the host and the peripheral device.

6. The device of claim 1, wherein when the USB packet received is determined to be the SOF packet, a direction of data flow is predicted to be from the host to the peripheral device, and wherein the processing system is configured to disable the peripheral receive port to save power.

7. The device of claim 1, wherein when the USB packet received is determined to be the SOF packet, a direction of data flow is predicted to be from the host to the peripheral device, and wherein the processing system is configured to maintain the peripheral receive port in a disabled state if it was already disabled.

8. The device of claim 1, wherein in response to the USB packet being determined to be the SOF packet, the processing system is further configured to disable the repeating circuitry.

9. The device of claim 8, wherein the repeating circuitry is configured to repeat and retime the USB packets using a clock, and wherein to disable the repeating circuitry, the processing system is further configured to turn off the clock.

10. The device of claim 1, wherein when the USB packet received is determined to be the non-SOF packet, a direction of data flow is predicted to be from the peripheral device to the host, and wherein the processing system is configured to enable the peripheral receive port to receive a data packet or a handshake packet generated by the peripheral device in response to the non-SOF packet.

11. The device of claim 1, wherein when the USB packet received is determined to be the non-SOF packet, a direction of data flow is predicted to be from the peripheral device to the host, and wherein the processing system is configured to maintain the peripheral receive port in an enabled state if it was already enabled.

12. The device of claim 1, wherein in response to the USB packet being determined to be the non-SOF packet, the processing system is further configured to enable the repeating circuitry.

13. The device of claim 1, wherein the non-SOF packet comprises an address token to indicate that the host is prepared to transfer a data packet to the peripheral device or to request the peripheral device to transfer a data packet to the host.

14. The device of claim 13, wherein when the non-SOF packet indicates that the host is prepared to transfer a data packet to the peripheral device, the processing system is further configured to enable the peripheral receive port to receive a handshake packet generated by the peripheral device to indicate to the host that the data packet was received by the peripheral device.

15. The device of claim 13, wherein when the non-SOF packet indicates that the host is prepared to transfer a data packet to the peripheral device, the processing system is further configured to enable the repeating circuitry to repeat and retime serial bits of the data packet received by the host receive port from the host for forwarding to the peripheral transport port for transmission to the peripheral device.

16. The device of claim 13, wherein when the non-SOF packet indicates that the host is requesting the peripheral device to transfer a data packet to the host, the processing system is further configured to enable the peripheral receive port to receive the data packet from the peripheral device.

17. The device of claim 13, wherein when the non-SOF packet indicates that the host is requesting the peripheral device to transfer a data packet to the host, the processing system is further configured to enable the repeating circuitry to repeat and retime serial bits of the data packet received by the peripheral receive port from the peripheral device for forwarding to the host transport port for transmission to the host.

18. The device of claim 1, further comprising a plurality of peripheral receive ports configured to receive USB packets from a plurality of peripheral devices, and wherein the processing system is further configured to:
in response to the USB packet being determined to be the SOF packet, disable the plurality of peripheral receive ports to stop the device from receiving USB packets from all of the peripheral devices.

19. The device of claim 18, wherein in response to the USB packet being determined to be the non-SOF packet, the processing system is further configured to:
- determine the non-SOF packet is addressed to one of the peripheral devices; and
- enable the peripheral receive port corresponding to the addressed peripheral device to prepare the enabled peripheral receive port to receive USB packets from the addressed peripheral device.

20. The device of claim 19, wherein the processing system is further configured to disable the peripheral receive ports corresponding to remaining non-addressed peripheral devices.

* * * * *